US011020660B2

(12) United States Patent
Pereira

(10) Patent No.: US 11,020,660 B2
(45) Date of Patent: Jun. 1, 2021

(54) TRANSACTIONAL MEMORY SYNCHRONIZATION BETWEEN MULTIPLE SESSIONS OF A VIDEO GAME

(71) Applicant: Sony Interactive Entertainment LLC, San Mateo, CA (US)

(72) Inventor: Edward Pereira, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/282,283

(22) Filed: Feb. 21, 2019

(65) Prior Publication Data

US 2020/0269131 A1  Aug. 27, 2020

(51) Int. Cl.
*A63F 13/35* (2014.01)
*A63F 13/352* (2014.01)
(Continued)

(52) U.S. Cl.
CPC .......... *A63F 13/352* (2014.09); *A63F 13/355* (2014.09); *G06F 8/656* (2018.02);
(Continued)

(58) Field of Classification Search
CPC ...... A63F 13/352; A63F 13/335; A63F 13/31; A63F 13/358; A63F 13/80; A63F 13/822;
(Continued)

(56) References Cited

U.S. PATENT DOCUMENTS

2003/0005099 A1* 1/2003 Sven .................. H04L 41/0233
709/223
2003/0084094 A1* 5/2003 Shim ...................... H04L 29/06
709/203

(Continued)

FOREIGN PATENT DOCUMENTS

EP          2745891 A1     6/2014
WO       2015081022 A1     6/2015

OTHER PUBLICATIONS

Liu, Dong: "ROIA: The Architecture and State Consistency", Multimedia Information Networking and Security (Mines), 2012 Fourth International Conference on, IEEE, Nov. 2, 2012 (Nov. 2, 2012), pp. 374-377, XP032303480, DOI: 10.1109/MINES.2012.195; ISBN: 978-1-4673-3093-0.

(Continued)

*Primary Examiner* — Justin L Myhr
(74) *Attorney, Agent, or Firm* — Penilla IP, APC

(57) ABSTRACT

An online gaming service is provided, having two or more servers, the two or more servers being located in two or more data centers, including: a transaction layer implemented across the two or more servers, for handling synchronization between different sessions of a video game that are respectively executed by the two or more servers; wherein the different sessions of the video game are respectively configured to provide viewing of a virtual space through respective client devices; wherein the transaction layer is configured to identify sessions providing viewing of proximate regions of the virtual space, and effect transactional memory synchronization for the identified sessions, such that events in the virtual space generated by the identified sessions are synchronized across each of the identified sessions.

17 Claims, 6 Drawing Sheets

(51) Int. Cl.
  *A63F 13/355* (2014.01)
  *G06F 8/656* (2018.01)
  *G06F 9/455* (2018.01)
  *G06F 9/50* (2006.01)

(52) U.S. Cl.
  CPC ........ *G06F 9/45558* (2013.01); *G06F 9/5077* (2013.01); *G06F 2009/45595* (2013.01)

(58) Field of Classification Search
  CPC ........ A63F 13/12; A63F 13/216; A63F 13/35; A63F 13/69; A63F 13/77; A63F 13/79; A63F 13/60; A63F 13/95; A63F 2300/407; A63F 2300/513; A63F 2300/807; A63F 2300/50; A63F 2300/534
  See application file for complete search history.

(56) References Cited

U.S. PATENT DOCUMENTS

| | | | |
|---|---|---|---|
| 2006/0010256 A1* | 1/2006 | Heron ..................... | A63F 13/12 710/1 |
| 2006/0258462 A1* | 11/2006 | Cheng ..................... | G07F 17/32 463/42 |
| 2009/0275414 A1 | 11/2009 | Lee et al. | |
| 2009/0287614 A1* | 11/2009 | Amsterdam .......... | A63F 13/792 705/400 |
| 2009/0325712 A1* | 12/2009 | Rance .................... | A63F 13/12 463/42 |
| 2012/0142429 A1* | 6/2012 | Muller ................... | A63F 13/45 463/42 |
| 2013/0145429 A1* | 6/2013 | Mendel .................. | G06F 21/00 726/4 |
| 2015/0045118 A1* | 2/2015 | Bishop ................ | G07F 17/3227 463/29 |
| 2015/0111643 A1* | 4/2015 | Olofsson ............... | A63F 13/493 463/31 |
| 2017/0050111 A1* | 2/2017 | Perry ..................... | H04L 67/10 |
| 2017/0099181 A1* | 4/2017 | Hawking ............ | G06F 3/04842 |
| 2017/0216720 A1* | 8/2017 | Colenbrander ....... | A63F 13/352 |

OTHER PUBLICATIONS

Shen, Siqi et al.: "Massivizing Multi-player Online Games on Clouds", Cluster, Cloud and Grid Computing (CCGRID), 2013 13th IEEE/ACM International Symposium on, IEEE, May 13, 2013 (May 13, 2013), pp. 152-155, XP032431181, DOI: 10.1109/CCGRID. 2013.23 ISBN: 978-1-4673-6465-2.

Liu, Dong et al.: "A New Approach to Scalable ROIA in Cloud", 2013 Fourth International Conference on Emerging Intelligent Data and Web Technologies, IEEE, Sep. 9, 2013 (Sep. 9, 2013), pp. 51-55, XP032507313, DOI: 10.1109/EIDWT.2013.13 [retrieved on Oct. 14, 2013].

PCT International Search Report and Written Opinion of the International Searching Authority issued in corresponding International Patent Application No. PCT/US2020/018011 dated May 14, 2020 (PCT Forms ISA 220, 210, 237) (16 total pages).

* cited by examiner

TRANSACTIONAL MEMORY SYNCHRONIZATION BETWEEN MULTIPLE SESSIONS OF A VIDEO GAME

BACKGROUND

Field of the Disclosure

The present disclosure relates to systems and methods for transactional memory synchronization amongst different sessions of an interactive application, such as a video game.

Description of the Related Art

A current area of rapidly growing technology is the field of video gaming, now encompassing a multitude of gaming platforms, including dedicated gaming consoles, personal computers (PC), and more recently, cloud gaming and mobile devices. One example of a networked gaming service/system is the PlayStation® Network, which includes various gaming services supporting both console-based and cloud-based gaming.

In a cloud gaming setup, users are able to access a number of games on a cloud gaming site over a network, such as the Internet, and begin interaction/playing the game. In order to select a game for game play, a user accesses his/her account on the cloud gaming site, and initiates one of a plurality of games that are available to the user account for game play. The video generated from the cloud video game is transported to a client device. One example of a cloud gaming system is the Playstation® Now cloud gaming service.

At present, simulations such as video games can be executed by cloud server computers and represent a virtual world. To facilitate a large virtual world and many players interacting in such a virtual world, the virtual world may be handled by several different server computers. There can be multiple sessions of the video game that each control a different portion of the virtual world, and such sessions are executed by different server computers that may be located in different data centers. Thus, a given player may connect to different server computers (and different sessions) as the player moves across the virtual world. So while there may be multiple sessions, they do not simultaneously represent the same reality or virtual space or portion of the virtual world. If two players share the same virtual space, then they typically connect to the same server machine.

However, can result in several problems. For example, when players switch from one server to another as they transition from one portion of a virtual world to another, they may experience lags or delays when transitioning. Further, all users wishing to interact in a particular region of the virtual world are required to connect to the same server machine or data center. This may be problematic because there may be too many users wishing to connect to the same server machine in order to access the same virtual space, and that server machine may have insufficient resources or bandwidth to handle all such connections without degrading the quality of the game. Another problem is that the location of the particular server machine may be in a data center that is remote from a given player, such that establishing a strong network connection to support high quality game streaming for the given player becomes difficult. Thus, switching from one sever to another can cause changes in game streaming quality due to different network conditions resulting from the different locations of the servers. In some instances, game streaming quality can be degraded, in the form of increased latency, reduced video quality, etc.

In sum, at present, different server machines, and by extension different data centers, do not simultaneously represent the same (virtual) reality in the context of a given simulation or video game. Instead, different server machines handle different portions of a virtual world, and this can produce problems as described above.

It is within this context that embodiments of the disclosure arise.

SUMMARY OF THE DISCLOSURE

Implementations of the present disclosure provide methods and systems for transactional memory synchronization amongst different sessions of an interactive application, such as a video game or simulation.

In some implementations, a method is provided, including the following operations: executing a first session of a video game in a first data center; concurrent with the first session, executing a second session of the video game in a second data center; wherein the first session and second session independently generate a first game state and a second game state, respectively, the first game state and the second game state simultaneously representing a shared virtual space; wherein events in the shared virtual space effected via the first session are implemented through transactions on a first set of memory objects stored at the first data center, the first session accessing a first library configured to generate a first set of update packages, based on the transactions on the first set of memory objects, and transmit the first set of update packages to the second data center; wherein events in the shared virtual space effected via the second session are implemented through transactions on a second set of memory objects stored at the second data center, the second session accessing a second library configured to generate a second set of update packages, based on the transactions on the second set of memory objects, and transmit the second set of update packages to the first data center; applying the first set of update packages to the second set of memory objects at the second data center; applying the second set of update packages to the first set of memory objects at the first data center; wherein the generating, transmitting, and applying of the first set and second set of update packages enables shared real-time interactivity in the shared virtual space via the first and second sessions.

In some implementations, the first session and the second session do not communicate with each other, such that the first session executes by using inputs received at the first data center and the first set of memory objects to continuously update the first game state, and the second session executes by using inputs received at the second data center and the second set of memory objects to continuously update the second game state.

In some implementations, the inputs received at the first data center are received from a first client device, and wherein the inputs received at the second data center are received from a second client device.

In some implementations, the generating, transmitting, and applying of the first set and second set of update packages enables synchronization of at least some of the first set of memory objects with corresponding ones of the second set of memory objects.

In some implementations, applying the first set of update packages changes one or more values of the corresponding ones of the second set of memory objects, and wherein applying the second set of update packages changes one or more values of the at least some of the first set of memory objects.

In some implementations, each of the update packages includes a time stamp, a memory identifier, and a value for a memory object identified by the memory identifier.

In some implementations, applying each of the update packages includes setting a value of the memory object identified by the memory identifier to the value of the update package.

In some implementations, applying each of the update packages includes determining whether the time stamp of the update package is a latest time stamp for the memory object identified by the memory identifier, and if so, then setting a value of the memory object identified by the memory identifier to the value of the update package.

In some implementations, the events in the shared virtual space effected via the first session include changes in position of a first virtual character that is controlled through the first session, and wherein the events in the shared virtual space effected via the second session include changes in position of a second virtual character that is controlled through the second session.

In some implementations, the execution of the first session renders a first view of the shared virtual space, and wherein the execution of the second session renders a second view of the shared virtual space, such that the events in the shared virtual space effected through the first and second sessions are simultaneously viewable through the first and second views of the shared virtual space.

In some implementations, an online gaming service is provided, having two or more servers, the two or more servers being located in two or more data centers, comprising: a transaction layer implemented across the two or more servers, for handling synchronization between different sessions of a video game that are respectively executed by the two or more servers; wherein the different sessions of the video game are respectively configured to provide viewing of a virtual space through respective client devices; wherein the transaction layer is configured to identify sessions providing viewing of proximate regions of the virtual space, and effect transactional memory synchronization for the identified sessions, such that events in the virtual space generated by the identified sessions are synchronized across each of the identified sessions.

In some implementations, each session of the video game executes independently of the other sessions of the video game, such that each session of the video game does not manage communications with the other sessions of the video game, and such that each session of the video game is unaware of the other sessions of the video game.

In some implementations, effecting transactional memory synchronization for the identified sessions includes identifying a memory transaction that causes an event in the virtual space generated by one of the identified sessions, and propagating the memory transaction to other ones of the identified sessions.

In some implementations, propagating the memory transaction to other ones of the identified sessions includes generating an update package including a timestamp of the memory transaction, an identifier for a memory object to which the memory transaction is applied, and a value that is set by the memory transaction.

In some implementations, the transaction layer is configured to identify sessions providing viewing of proximate regions of the virtual space, by analyzing virtual locations in the virtual space that are respectively associated to the different sessions of the video game.

In some implementations, an online gaming service is provided, having two or more servers, the two or more servers being located in two or more data centers, comprising: a transaction layer implemented across the two or more servers, for handling synchronization between different sessions of a video game that are respectively executed by the two or more servers; wherein the different sessions of the video game are respectively configured to provide viewing of a virtual space through respective client devices; wherein the transaction layer is configured to effect transactional memory synchronization for the different sessions, such that events in the virtual space generated by the different sessions are synchronized across each of the different sessions; wherein each session of the video game executes independently of the other sessions of the video game, such that each session of the video game does not manage communications with the other sessions of the video game, and such that each session of the video game is unaware of the other sessions of the video game.

In some implementations, effecting transactional memory synchronization for the identified sessions includes identifying a memory transaction that causes an event in the virtual space generated by one of the sessions, and propagating the memory transaction to other ones of the sessions.

In some implementations, propagating the memory transaction to other ones of the sessions includes generating an update package including a timestamp of the memory transaction, an identifier for a memory object to which the memory transaction is applied, and a value that is set by the memory transaction.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Figure 1:
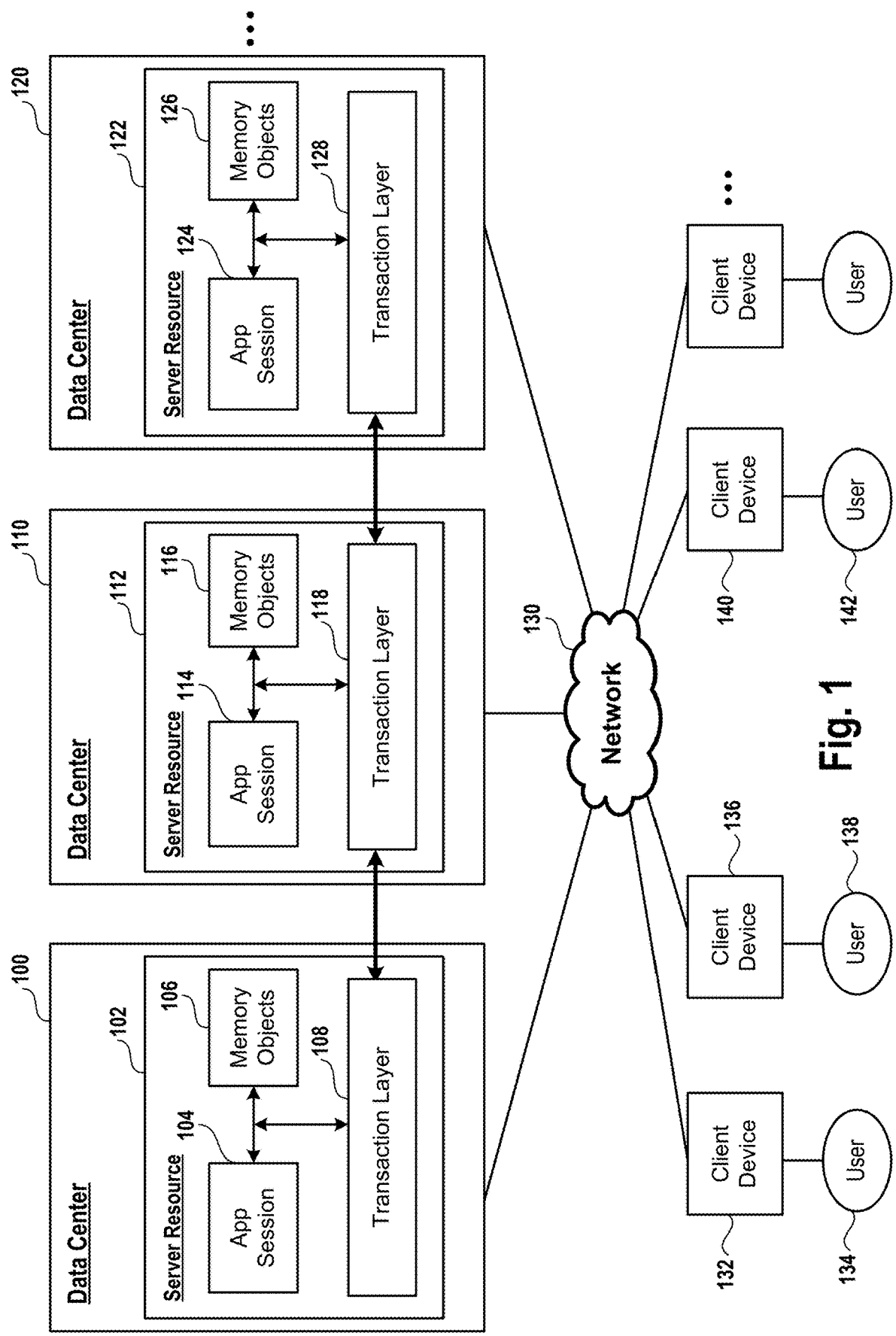
FIG. 1 conceptually illustrates a system for cloud gaming employing transactional memory synchronization across data centers, in accordance with implementations of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

At present, multiple server computers/machines, which may be in multiple different data centers, do not represent the same (virtual) reality in the context of a given video game or simulation, but instead each represent different portions of the virtual world. This can be problematic, as all users wishing to access a specific portion of the virtual world are required to connect to the same server/data center, and because resources in a data center are limited, this can lead to resource issues as previously described.

To address such issues, implementations in accordance with the present disclosure provide for transactional memory synchronization across multiple data centers so that they can represent the same reality. In order to share a reality among data centers, a transaction layer is created that tracks changes and replicates them across data centers. Broadly speaking, a given transaction includes a timestamp indicating the time of the transaction, a memory location, and a value or change in a value (e.g. of a variable to be updated). By enabling transactional memory synchronization across data centers, multiple data centers can represent the same reality, enabling resource utilization to be spread out across data centers, and also affording users better network connectivity by allowing them to connect to data centers that are more proximate to their locations.

Furthermore, the implementations of the disclosure aid developers by providing a system of automation to create, transmit, receive, and apply memory transactions. Thus, the application developer can develop agnostic of how many data centers represent the shared reality of the video game. Furthermore, the transaction mechanism can figure out the coalesced state of the shared reality, so that the developer does not need to be concerned with managing the state between multiple data centers.

Broadly speaking, implementations of the disclosure apply to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc. A networked gaming service/system such as the PlayStation® Network can provide various gaming services supporting cloud-based gaming.

For ease of description, throughout the present disclosure, it will be appreciated that references to a "user" or "player" will often be synonymous with a user/player (client) device that is associated to or operated by the user, as the user typically interfaces with systems in accordance with the present disclosure by using or operating a user device. Thus, while the term "user" is used for ease of description in the present disclosure, it will be appreciated that the term "user" can encompass both the user as well as a user device that is operated by the user or otherwise associated therewith, and further the terms "user" and "user device" may often be used interchangeably in the present description of the implementations, as will be apparent to those skilled in the art.

FIG. 1 conceptually illustrates a system for cloud gaming employing transactional memory synchronization across data centers, in accordance with implementations of the disclosure. As shown, there are multiple data centers that each executes a copy of an application representing the same reality. For example, data center 100 includes server resource 102. Server resource 102 can include any computing resources in the data center 100 which may be utilized to execute and stream applications, including by way of example without limitation, various server computers/machines, bladed computing resources, CPU/GPU/APU, volatile and non-volatile memory or storage devices, local networking devices, etc. In some implementations, server resource 102 can be a virtualized computing resource abstracted over underlying computing hardware.

An application session 104 is executed on server resource 102 in the data center 100. In some implementations the application session 104 is a session of a video game, simulation or other interactive program. Broadly speaking, the application session 104 generates and updates a program state (or game state) that defines a virtual space/reality of the application session 104. Generally speaking, for purposes of the present disclosure, the "reality" of an application/video game is the virtual interactive environment generated and maintained by the application/video game in which multiple users may interact and affect the state of objects through respective client devices.

In representing the virtual space the application session 104 performs transactions on memory objects 106. The memory objects 106 can include any variables, data or data structures that define the state of objects or properties in the virtual space and interactions between objects therein. Merely by way of example without limitation, examples of memory objects or items defined by memory objects can include the following and/or properties of the following: characters, avatars, persons, animals, clothing, movements, weapons, shields, armor, vehicles, scenery, virtual locations, virtual times, inventories, experience, virtual currency, health, lives, damage, virtual objects, virtual actions, etc.

In accordance with implementations of the disclosure, multiple data centers may represent the same reality. For example, in the illustrated implementation additional data centers 110 and 120 are shown, which may execute the same application. In the case of data center 110, server resource 112 is utilized to execute application session 114, which executes transactions on memory objects 116. Likewise, data center 120 utilizes server resource 122 to execute application session 124, which executes transactions on memory objects 126. The application sessions 114 and 124 are different sessions of the same application as application session 104, and the memory objects 116 and 126 can include many or all of the same memory objects as memory objects 106. While data centers 100, 110, and 120 are shown in the illustrated implementation, it will be appreciated that there can be additional data centers and that the principles of the present disclosure apply similarly regardless of the number of data centers.

Each application session receives input from one or more client devices that are operated by respective users. Further, each application session renders video (including image data and audio data) providing views of the virtual space to the client devices, for presentation on a display, which may be integrated into the client devices (e.g. laptop, tablet, cell phone, etc.), or connected to the client devices (e.g. television, display, or head-mounted display connected to a gaming console, personal computer, etc.). For example, in the illustrated implementation a client device 132, operated by a user 134, may communicate over network 130 to the data center 100, providing input to the application session 104 and streaming video from the application session 104. The input can be generated based on controller input from a controller device that may be connected to, or integrated into, the client device 132. Examples of controller devices include the following: keyboard, mouse, trackball, trackpad, touchscreen, joystick, motion controller, game controller, image capture device or camera, microphone, depth camera, etc. The transmission of input and video as described to enable interactivity/gameplay with the application or video game is referred to as streaming the application or streaming (gameplay of) the video game.

Thus, further in accordance with the illustrated implementation, the user 138 may operate client device 136 to stream the application session 114; and the user 142 may operate client device 140 to stream the application session 124. It should be appreciated that there may be many more client devices and users, and in some implementations hundreds or thousands of client devices and users connecting to the data centers to interact with the application sessions. The various users may stream from different application sessions, yet the users are able to simultaneously participate in the same virtual space/reality such that their activities are synchronized across sessions.

For example, in the illustrated implementation, interactivity is streamed from the data centers 100, 110, and 120 using the application sessions 104, 114, and 124, to stream to the client devices 132, 136, and 140, respectively. Each of the application sessions represents the same reality, and thus to facilitate synchronization of activity across application sessions, a transactional system is provided to handle data changes. Broadly speaking, the transactional system is configured so that when a piece of data is changed, then an underlying transaction layer creates an update package and sends it to other servers, and the other servers can apply the update package in accordance with the application's configuration for handling such updates.

By providing a transaction layer to facilitate how data changes across different sessions of the same reality, this makes it easy for the application developer, so that they do not have to think about how to transmit that data and maintain synchronization amongst different sessions of the application. Rather, the developer can develop the application in a singular sense, and does not have to develop mechanisms to support synchronization amongst objects that simultaneously exist on multiple servers or in multiple data centers.

With continued reference to FIG. 1, each of the data centers implements an instance of the transaction layer. As shown, server source 102 in data center 100 implements transaction layer 108; server source 112 in data center 110 implements transaction layer 118; and server source 122 in data center 120 implements transaction layer 128. Each of the transaction layers is configured to synchronize transactions on the memory objects by the application sessions across the data centers.

By way of example without limitation, the user 134 operating client device 132 may interact with the virtual space generated by application session 104. That is, the application session 104 streams video providing a view of the virtual space to the client device 132 and updates the application state of the application session 104 by, in part, executing transactions on memory objects 106. The execution of the application session 104 can be driven in part by input received from the client device 132, e.g. based on controller input provided by the user 134 using a controller device that is operatively connected to, or integrated into, the client device 132.

When a transaction is executed on a given memory object that is one of the memory objects 106, the transaction layer 108 is configured to effect synchronization across the data centers. The accomplish this, the transaction layer 108 creates an update package including an identifier/location of the memory object, a time stamp of the transaction, and a value used to update the memory object (e.g. a new value for the memory object, an offset from an existing value, etc.). The transaction layer 108 creates the update package and transmits the update package to the data centers 110 and 120, and the corresponding transaction layers 118 and 128 at the data center 110 and 120, respectively, handle and apply the update package. For example, the transaction layer 118 may apply the update package to update the value of the corresponding memory object in the memory objects 116; and the transaction layer 128 may apply the update package to update the value of the corresponding memory object in the memory objects 126.

By way of example without limitation, the memory object may represent the location of a character that is controlled by the user 134 via client device 132. When the user 134 moves the character, the application session 104 applies input from the client device 132 that effects movement of the character such that its location changes from a first location to a second location in the virtual space. This can be implemented as a transaction on the memory object changing its values from values that identify the first location to values that identify the second location. When this occurs, the transaction layer 108 generates the update package including the timestamp of the transaction, an identifier of the memory object, and the values that identify the second location. The transaction layer 108 transmits the update package to the other transaction layers 118 and 128, which apply the update package, updating the corresponding memory objects of the memory objects 116 and 126 with the values that identify the second location. In this manner, the location of the character that has changed in the application session 104 is updated across application sessions 114 and 124. Thus, for example the user 138 that uses client device 136 to stream from the application session 114, may see the character move to the second location when viewing the virtual space where the character is located. Similarly, the user 132 that uses client device 140 to stream from the application session 124, may see the character move to the second location when viewing the virtual space where the character is located.

It will be appreciated that the users 134, 138, and 142 are in a shared space, yet each of them is streaming the interactivity from a distinct and different session of the application. In a sense, the different application sessions 104, 114, and 124 each independently generate the virtual space that is being shared, but are synchronized to each other by virtue of synchronization of memory objects (that matter for purposes of shared interactivity) through the transaction layer. The transaction layer propagates changes from each data center to each of the other data centers, thereby maintaining synchronization amongst the different application sessions. This enables real-time interactivity between the users in the shared space that is consistent across data centers.

Continuing with the above-described scenario, if user 134's character kicks a rock and it is going to trip user 138's character in the shared virtual space, then information indicating this action should be sent from data center 100 to data center 110, so that it can be rendered by application session 114 in data center 110. And then if user 138's character jumps over the rock, then the information for this action is sent back so that the application session 104 in data center 100 can render the jump. In accordance with the principles above, user 134's action of kicking the rock is reflected in one or more transactions on one or more of the memory objects 106 (e.g. memory object(s) that define the state/movement/location of user 134's character, memory object(s) that define the state/movement/location of the rock, etc.). These transactions are packaged by transaction layer 108 and transmitted to transaction layer 118, where they are applied to memory objects 116 and rendered by application session 114. And further in accordance with the principles of the present disclosure, user 138's action of jumping over the rock is reflected in one or more transactions on one or more of the memory objects 116 (e.g. memory object(s) that define the state/movement/location of user 138's character, memory object(s) that define the state/movement/location of the rock, etc.). These transactions are packaged by transaction layer 118 and transmitted to transaction layer 108, where they are applied to memory objects 106 and rendered by application session 104. Additionally, user 142's character in the virtual space may be viewing the kicking of the rock and jump over the rock, and thus transaction layer 128 also receives the packaged transactions from the transaction layers 108 and 118, which are applied by the transaction layer 128 and rendered by the application session 124 so that the user 142 may view the activity occurring in the virtual space, consistent with the reality that is represented by the other application sessions 104 and 114.

In accordance with implementations of the disclosure, the data centers may be geographically remote from one another. For example, data center 100 (and client device 132 and user 134) could be in the United States, while data center 110 (and client device 136 and user 138) could be in Japan, and data center 120 (and client device 140 and user 142) could be in Great Britain. Each player connects to a data center that executes the application that is proximate to their respective client device. Yet each data center can run the application agnostic of the fact that it is running in multiple data centers. Each instance of the application in each data center is executing independently, such that at every frame, each session is processing with the available data that it has, generating a frame with the inputs reflected in the available memory objects. And as the memory objects are being synchronized, then so the sessions are able to represent a synchronized reality. And this simplifies development of the code for the application, because the synchronization is handled by the underlying transaction layer rather than at the application level, and thus the application can be agnostic of the fact that it may be running simultaneous sessions in different data centers. Each session does not need to be specifically configured to interact with another data center directly. For example, each session does not need to be aware of the data centers to which various users are connected, because each session is not concerned with sending a message to a specific data center based on the knowledge that a particular player is connected to that data center. In this sense, each session is unaware of the other sessions, and does not manage communication with other sessions in other data centers. Rather, the underlying transaction layer is handling updating each of the data centers as transactions on memory objects occur.

In some implementations, the application of the update package by each data center can be in accordance with predefined configurations for handling incoming updates. For example, in some implementations incoming updates are always applied. In some implementations, updates are applied if the timestamp of the update supersedes (is later than) the timestamp of the last transaction applied to the relevant memory object (e.g. applied by the local application session or from a prior update received from another data center). In some implementations, updates are first processed by the application session at the receiving data center and then applied, possibly after modification in some manner by the application session.

Figure 2:
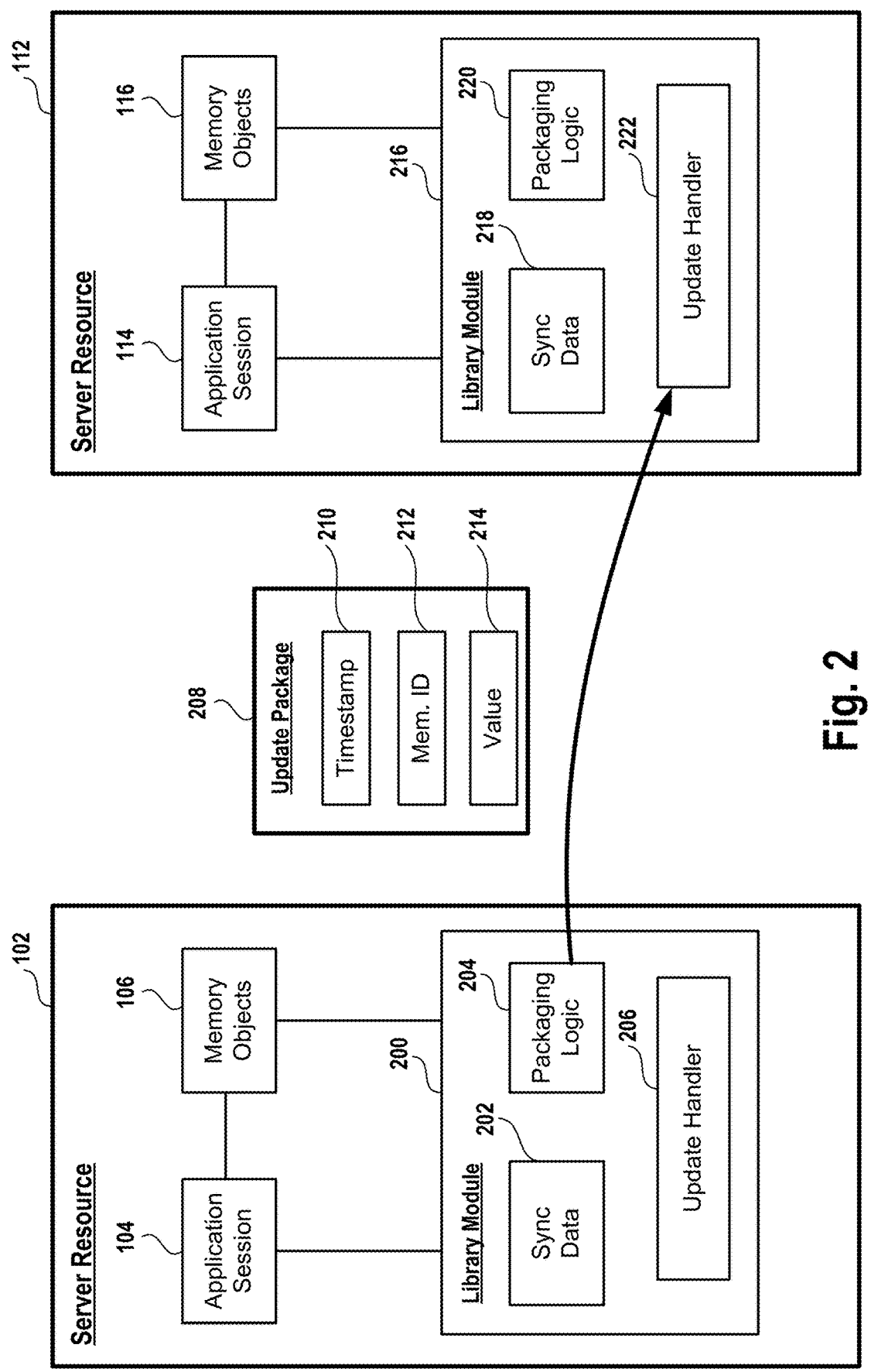
FIG. 2 illustrates a system for synchronization of memory objects between application sessions, in accordance with implementations of the disclosure.

FIG. 2 illustrates a system for synchronization of memory objects between application sessions, in accordance with implementations of the disclosure. Broadly speaking, in some implementations the transaction layer is implemented through a library that identifies the set of data that should be synchronized amongst data centers, and therefore for which updates should be transmitted when changes are detected. Thus, when transactions on such data occur, the changes are effected through the library. Generally, the library is configured to package up such memory transactions (e.g. including memory location/identifier, timestamp, changed/new value), and broadcast the transactions to other data centers. When received by each data center, the application specifies what happens when new data updates are received. Different applications may have different configurations for how to manage data that changes. In some implementations, whenever new data is received, it is applied if it is the latest update (e.g. based on timestamp); whereas in other implementations, for any new data, updates may be evaluated and possibly modified and applied differently depending upon the current application state. Thus, every server may run an instance of the library module that identifies transactions that should be updated across servers. When such a transaction occurs, it is identified by the library module and transmitted to the other data centers.

With continued reference to the implementation of FIG. 2, a library module 200 is shown instantiated on server resource 102, which also runs application session 104 and hosts memory objects 106 as previously described. The library module 200 includes synchronization data 202 which is configured to identify memory objects/data that should be synchronized across data centers. In some implementations the synchronization data 202 includes logical memory locations or identifiers for some or all of the memory objects 106, which are consistent across all instances of the library module, so that when library modules communicate updates to each other, they may reference equivalent memory objects in different data centers. In some implementations the synchronization data 202 includes a mapping of local memory objects to the logical memory locations/identifiers, so that a given logical memory location/identifier maps to an equivalent memory object in each data center.

As noted, the synchronization data 202 can be configured to identify which memory objects are to be synchronized across data centers. In some implementations, specific memory objects or memory identifiers are marked or identified (or pre-marked/pre-identified) in the synchronization data 202 as being data that is to be synchronized. In some implementations, the synchronization data 202 identifies types or classes of data/variables that are to be synchronized. In some implementations the synchronization data 202 identifies transactions or transaction types that are to be synchronized. Regardless of the specific implementation, the synchronization data 202 is configured to enable identification of which memory objects 106 are to be synchronized across data centers.

In some implementations, the application session 104 is configured to reference the library module 200 to determine which memory objects or memory transactions need to be synchronized. Then, if a memory transaction occurs that needs to be synchronized, then the application session 104 may invoke the library module 200 to handle the transaction and/or the synchronization. In some implementations, the library module 200 is configured to handle memory transactions from the application session 104, and is configured to determine which transactions will be synchronized across the various application sessions or data centers. It will be appreciated that for memory transactions that do not require synchronization, then only the affected local memory object(s) will be changed as a result of the transaction (one or more of memory objects 106); whereas for memory transactions that do require synchronization, then both the local memory object as well as corresponding memory objects in other sessions/data centers will be changed as a result of the transaction.

It will be appreciated that the library module 200 can be configurable to allow a developer to determine which memory objects and/or transactions will be synchronized across data centers. In some implementations, the library module 200 (for example when included as part of a game engine or set of application libraries) may include a standard or default configuration that pre-identifies certain data or transaction types as ones that will be synchronized by the library module 200. However, in some implementations this configuration can be adjusted by the developer. In some implementations, the application can be configured by the developer to specify which data or transactions to synchronize or which default configurations to adjust. In the case of a static library, this may occur during the application build, whereas in the case of a dynamic library, this may occur when the library is loaded at runtime.

It will be appreciated that as developers mark what transactions or objects are important to be synchronized, then the library is configured to handle the process of updating such transactions or the state of such objects across data centers. It will be appreciated that not all features of a virtual space may need to be synchronized. For example, while it may be desirable to synchronize players' characters or avatars across sessions, it may not be necessary to synchronize other elements in the virtual space such as the movement of foliage or randomly generated birds flying overhead, or elements that generally do not affect interactivity between users in the shared virtual space. It should be appreciated that as not all virtual objects or states are synchronized, then the amount of data that is required to be transmitted between data centers for synchronization is reduced, and network bandwidth is conserved. This helps to enable real-time or substantially real-time synchronization across sessions by reducing the likelihood that latency due to insufficient bandwidth will become problematic.

With continued reference to FIG. 2, when a transaction on a memory object is determined to require synchronization across sessions/data centers, then packaging logic 204 of the library module 200 is configured to package the relevant information for updating the other data centers. In some implementations the packaging logic 204 constructs an update package 208 containing information for updating and synchronizing the relevant memory objects at the other data centers. In some implementations, the update package 208 includes a timestamp 210 that indicates the time of the transaction or change to the memory object as determined or executed by the application session 104, a memory identifier/location 212 that identifies or locates the memory object that is to be updated at the receiving data center, and a value 214 that may define a new/current/updated value for the memory object. In some implementations the value 214 defines an offset or change from a prior value or other reference value. The packaging logic 208 packages up the information to generate the update package 208, and transmits the update package 208 to the other data centers.

In the illustrated implementation, the update package 208 is shown being transmitted to the data center 110, where it is handled by a respective library module 216 that is similar to the library module 200, but configured for the application session 114 and memory objects 116. The update package 208 is handled by an update handler 222, which in some implementations is included as part of the library module 216. In other implementations, the update handler 222 is separate from the library module 216.

The update handler 222 is configured to receive the update package 208 and apply the information in the update package 208 in accordance with predefined settings. In some implementations, the update handler implements rules for how and/or when to apply updates. It will be appreciated that that updates can be handled differently depending upon the transaction or memory object that is affected. For some transactions or memory objects, the update handler 222 may be configured to always apply the latest update. That is, the incoming update package 208 will be applied if the timestamp 210 is later than the time of the last modification to the memory object. For some transactions or memory objects, the update handler 222 may be configured to evaluate the update package 208 and apply it if it meets certain criteria or apply it with some modification. It will be appreciated that on a per-transaction basis, there can be different modes of handling update data when it is received.

While communication of an update from data center 100 to data center 110 has been described above, it will be appreciated that memory transactions generated by application session 114 at data center 110 may also trigger updates to be transmitted from data center 110 to data center 100. Each data center includes substantially the same library module as described above. In the illustrated implementation the library module 216 further includes synchronization data 218, which is analogous to synchronization data 202, and packaging logic 220, which is analogous to packaging logic 204. Likewise, the library module 200 at data center 100 further includes an update handler 206, which is analogous to update handler 222, for handling incoming update packages received from other data centers. Thus, in accordance with the above, the application session 114 may generate a memory transaction that triggers an update (as determined based on the synchronization data 218) to be transmitted from the data center 110 to the other data centers. Thus, in the illustrated implementation the packaging logic 220 will generate an update package that is transmitted to the data center 100, and applied by the update handler 206 to the memory objects 106.

While synchronization has been described in relation to data centers 100 and 110 above, it will be appreciated that the concepts can be extended to any number of data centers, such as data center 120 and others, which also run concurrent sessions of the application and the library module. Thus, each server/data center has the library module, and the library modules communicate with each other to propagate changes between the various sessions of the application, ensuring synchronization of the shared virtual space/environment. In this manner, the developer does not have to specify how transactions should update across data centers, but can code as if only running on a local data center. The library module is configured to identify which transactions need to be propagated to other sessions/data centers, having such transactions or relevant memory objects pre-marked or pre-identified in the library module to trigger updates when such transactions occur.

Merely by way of example without limitation, some examples of transactions that may be pre-identified in the library module to be triggering updates include the following: a virtual object (e.g. door) took a certain amount of damage; an item was removed from the virtual world (e.g. picked up by a player); a player's inventory increased/ decreased (e.g. of virtual item or property; a virtual object (e.g. vehicle) was destroyed; etc. It will be appreciated that such transactions can include any information that is important or necessary for another player connecting to another data center to be aware of if interacting in the same shared virtual space/environment.

In some implementations, updates may or may not be sent based on other factors. Updates that are triggered for sending may be filtered at the sending data center, for example, based on virtual geographic proximity of virtual objects of the receiving data centers.

Figure 3:
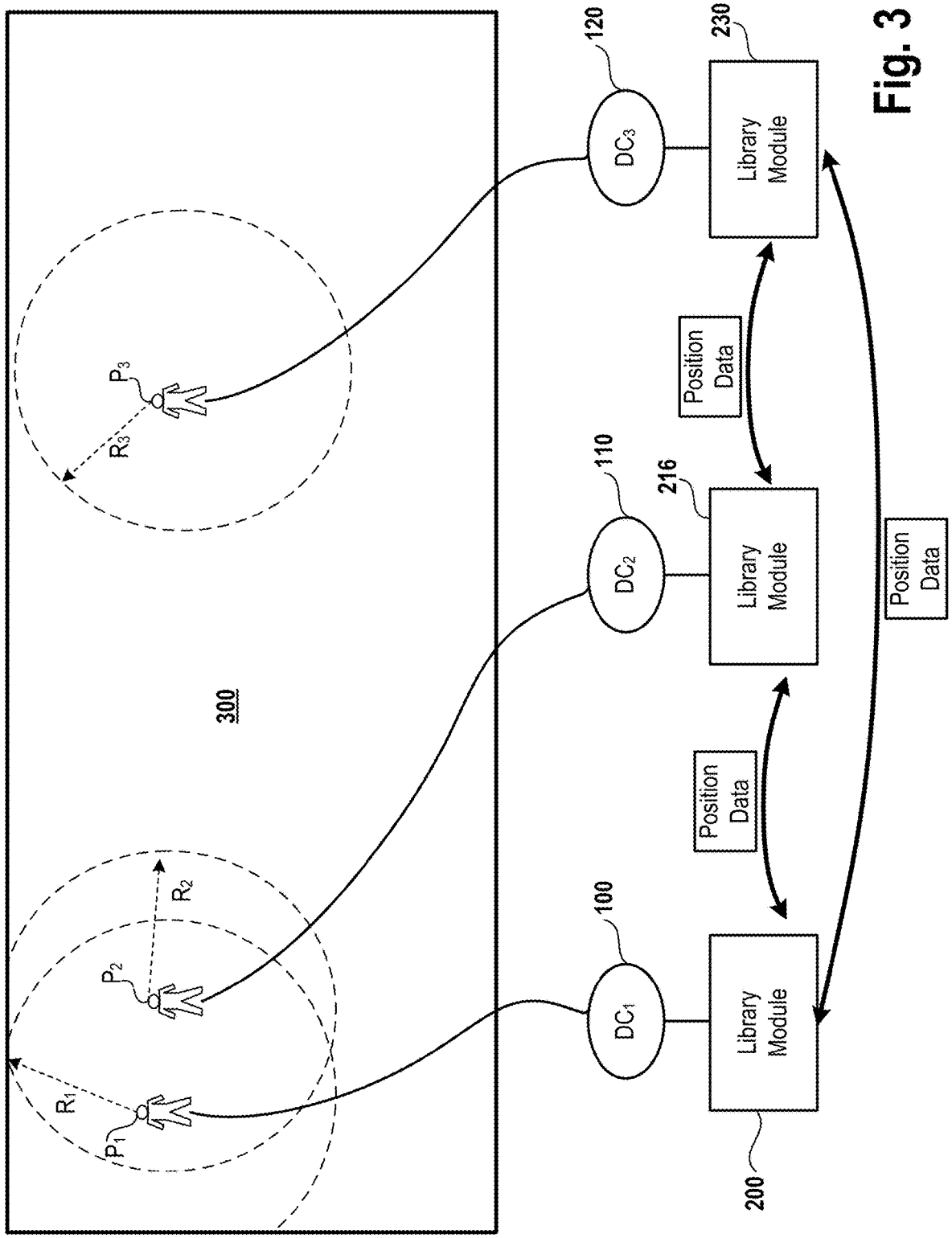
FIG. 3 conceptually illustrates a system in which updates are filtered based on virtual geographic proximity, in accordance with implementations of the disclosure.

FIG. 3 conceptually illustrates a system in which updates are filtered based on virtual geographic proximity, in accordance with implementations of the disclosure. In the illustrated implementation, a virtual space 300 is conceptually shown, with players $P_1$, $P_2$, and $P_3$ represented in the virtual space 300. It will be appreciated that the players can be represented in the virtual space by characters, avatars, vehicles, or other virtual objects that may be representative of the players. Thus, the position of the player in the virtual space is in fact the position of the player's representation, which are synonymously referenced for ease of description. As shown in the illustrated implementation, the players $P_1$ and $P_2$ are closer to each other in the virtual space 300 than player $P_3$.

Furthermore, player $P_1$ is controlled by data center 100; player $P_2$ is controlled by data center 110; and player $P_3$ is controlled by data center 120. That is, player $P_1$ is controlled from a client device that connects to data center 100; player $P_2$ is controlled from a client device that connects to data center 110; player $P_3$ is controlled from a client device that connects to data center 120.

As noted, in some implementations, updates are sent or not sent based in part on geographic location in the virtual space 300. To facilitate this functionality, the library modules can be configured to share position data with each other, the position data identifying the positions of players that are respectively associated with their data centers. Thus, in the illustrated implementation the library module 200 may share position data identifying the position of player $P_1$ with the other library modules 216 and 230 (of data centers 110 and 120, respectively). Likewise, the library module 216 may share position data identifying the position of player $P_2$ with the other library modules 200 and 230; and the library module 230 may share position data identifying the position of player $P_3$ with the other library modules 200 and 216. In this manner, each of the data centers receives data indicating geographic locations of interest for the other data centers. In this case, the geographic location of interest for a given data center is defined by the position of the player that is associated with that data center.

For example, when a change relating to player $P_1$ occurs (e.g. change in position, inventory, health, damage, appearance, associated weapon (firing), etc.), this may trigger the library module 200 to issue update packages to data centers for which such updates would be relevant. In some implementations, this can be based on distance from the player $P_1$. For example, in some implementations the library module 200 will send the update package to another data center if the player associated to that data center is within a predefined distance or radius of the player $P_1$. In the illustrated implementation, this is shown by the radius $R_1$. Because player $P_2$ is within the radius $R_1$, then the library module 200 will send the update package to the library module 216, as the player $P_2$ may be deemed to be close enough such that changes relating to player $P_1$ may affect or otherwise be relevant for player $P_2$. Conversely, because player $P_3$ is not within the radius $R_1$, then the library module 200 will not send the update package to the library module 230, as the player $P_3$ may be deemed to be far enough such that changes relating to player $P_1$ may not affect or otherwise be relevant for player $P_3$.

In a similar manner, changes relating to player $P_2$ may be propagated to players that are within a predefined radius $R_2$ of the player $P_2$. Thus, the data center 110 (using library module 216) will send updates regarding player $P_2$ to data center 100 (via library module 200), but will not send such updates to data center 120 as player $P_3$ is outside of the radius $R_2$. And similarly, the data center 120 (using library module 230) will not send updates regarding player $P_3$ to either of data centers 100 or 110 (but will not send such updates to the respective data center is a player enters the radius $R_3$).

While the foregoing has been described with respect to players, it should be appreciated that the principles can apply to any type of virtual object in the virtual space 300. That is, updates can be sent based on virtual geographic proximity in a virtual space.

In some implementations, communication of updates based on geographic proximity could be implemented through the library module as a configurable mechanism that may be turned on/off or activated/deactivated by the developer/application.

By filtering update sending based on proximity, it is possible to save resources, which can be useful in large game worlds, where there can be many players, some of whom may be remote from each other. In this manner, the sending server may decide whether data is important to the receiver. And thus, another layer of communication is provided in which servers communicate to each other what locations are important for their respective players, or what location they are affected by, so that each server may determine whether to send updates to another server.

In some implementations, a transaction or memory object can be marked with a location and/or radius at setup. Generally, locations will be updated regularly, whereas how far away another entity will be affected by a given transaction or memory object is configured at setup.

When a piece of data is changed, the library module can evaluate a list of servers and check each one to determine whether or not the update should be sent to that server. Thus, by filtering on the sending side, resources are conserved because not all updates are being sent to all servers. Each server periodically knows what locations or transactions or objects are important to each other.

In some other implementations, transactions themselves may communicate spatial relationships. For example, the above-described update package may further include location or proximity information. The update handler may determine whether to apply the update based in part on such location/proximity information.

In some implementations different servers/data centers may have authority over certain transactions or memory objects. For example, a given virtual object such as a character or vehicle may be controlled by one data center only, and no other data center will create a transaction on that virtual object. Rather, the other data centers will only receive data from the authoritative data center and apply it to update their corresponding virtual objects. In some implementations a data center may announce its authority over a transaction to the other data centers, and from that point on, other data centers will not create such transactions. Or if another data center tries to create a transaction, then the library could generate a failure state that could be later utilized for debugging purposes.

Broadly speaking implementations of the present disclosure can be included as part of a game engine.

Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 4A:
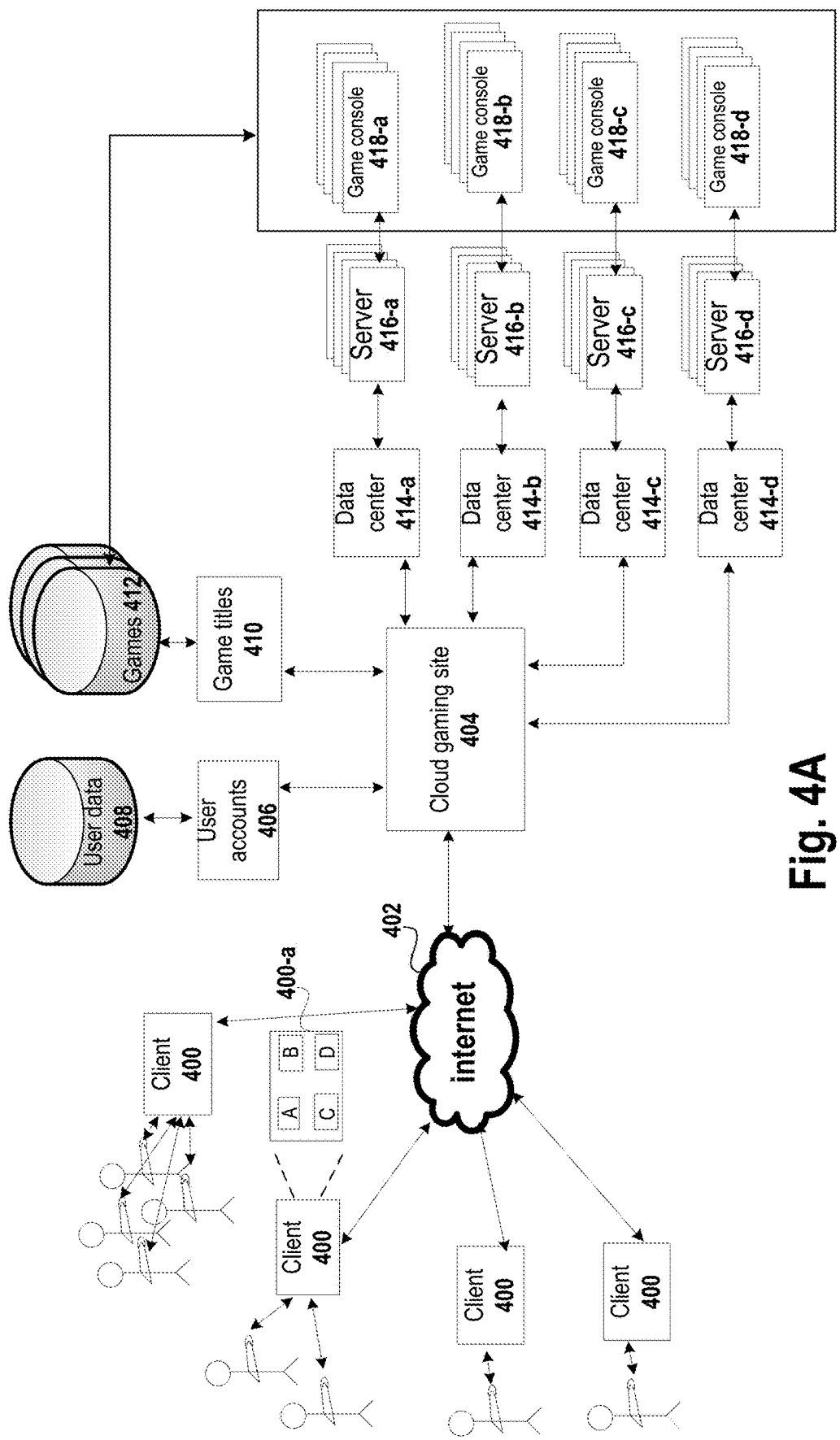
FIG. 4A illustrates an exemplary system used to load game files for a game available through a cloud gaming site, in accordance with implementations of the disclosure.

FIG. 4A illustrates an exemplary system used to load game files for a game available through a cloud gaming site. The system includes a plurality of client devices 400 that are communicatively connected to the cloud gaming site 404 over a network 402, such as the Internet. When a request to access the cloud gaming site 404 is received from a client device 400, the cloud gaming site 404 accesses user account information 406 stored in a user data store 408 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 410 to identify the game titles that are available at the game cloud site for the user account initiating the request. The game titles data store 410, in turn, interacts with a games database 412 to obtain the game titles for all the games that are available for the cloud gaming site. As new games are introduced, the games database 412 will be updated with the game code and the game titles data store 410 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 400-a, as shown in FIG. 4A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 4B:
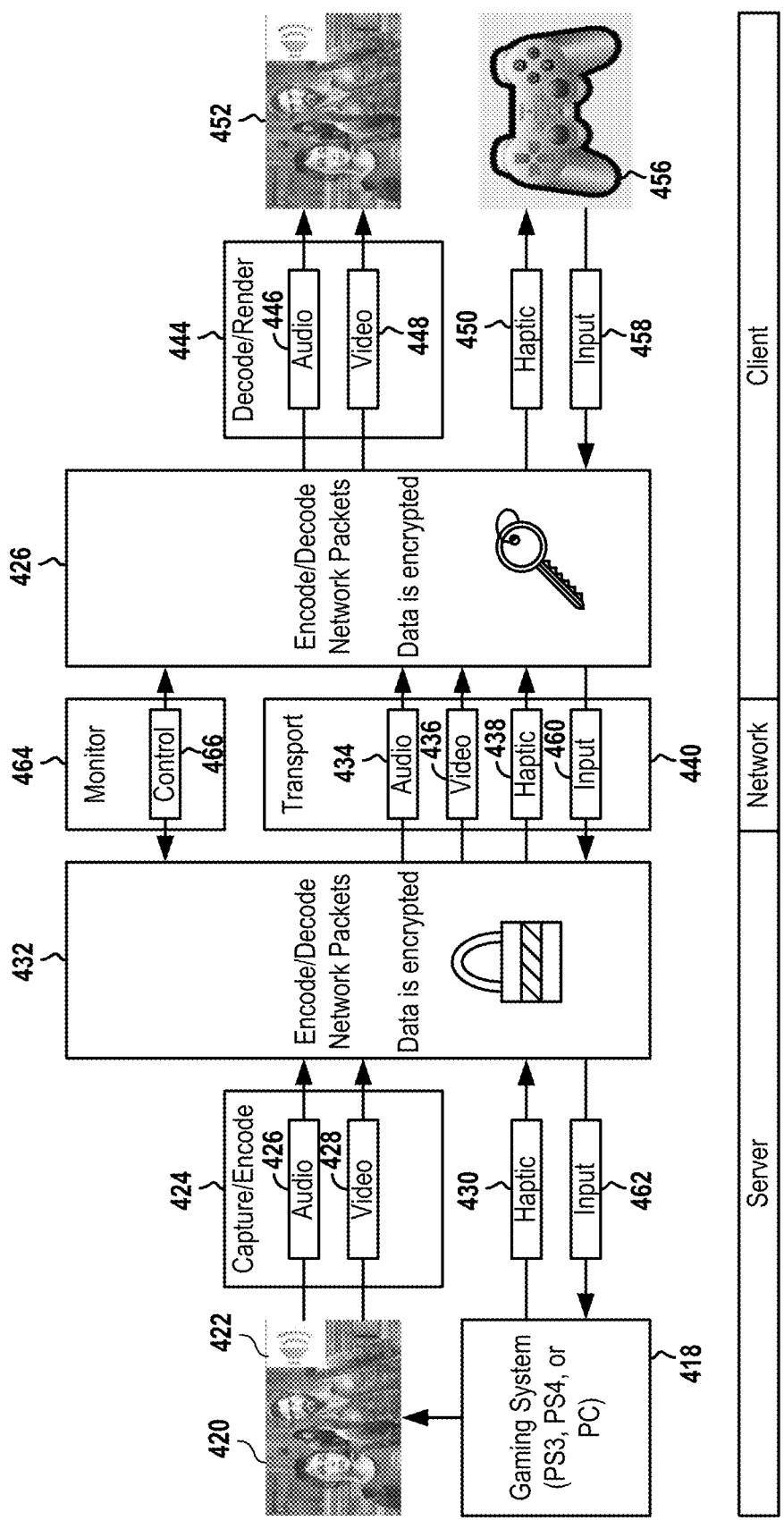
FIG. 4B is a flow diagram conceptually illustrating various operations which are performed for streaming a cloud video game to a client device, in accordance with implementations of the disclosure.

FIG. 4B is a flow diagram conceptually illustrating various operations which are performed for streaming a cloud video game to a client device, in accordance with implementations of the disclosure. The gaming system 418 executes a video game and generates raw (uncompressed) video 420 and audio 422. The video 420 and audio 422 are captured and encoded for streaming purposes, as indicated at reference 424 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-42, WMV, VP6/7/8/9, etc.

The encoded audio 426 and encoded video 428 are further packetized into network packets, as indicated at reference numeral 432, for purposes of transmission over a network such as the Internet. The network packet encoding process can also employ a data encryption process, thereby providing enhanced data security. In the illustrated implementation, audio packets 434 and video packets 436 are generated for transport over the network, as indicated at reference 440.

The gaming system 418 additionally generates haptic feedback data 430, which is also packetized into network packets for network transmission. In the illustrated implementation, haptic feedback packets 438 are generated for transport over the network, as further indicated at reference 440.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 440, the audio, video, and haptic feedback packets are transported over a network, such as and/or including the Internet. As indicated at reference 442, the audio packets 434, video packets 436, and haptic feedback packets 438, are decoded/reassembled by the client device to define encoded audio 446, encoded video 448, and haptic feedback data 450 at the client device. If the data has been encrypted, then the network packets are also decrypted. The encoded audio 446 and encoded video 448 are then decoded by the client device, as indicated at reference 444, to generate client-side raw audio and video data for rendering on a display device 452. The haptic feedback data 450 can be processed/communicated to produce a haptic feedback effect at a controller device 456 or other interface device through which haptic effects can be rendered. One example of a haptic effect is a vibration or rumble of the controller device 456.

It will be appreciated that a video game is responsive to user inputs, and thus, a similar procedural flow to that described above for transmission and processing of user input, but in the reverse direction from client device to server, can be performed. As shown, a user operating controller device 456 may generate input data 458. This input data 458 is packetized at the client device for transport over the network to the cloud gaming system. The input data packets 460 are unpacked and reassembled by the cloud gaming server to define input data 462 on the server-side. The input data 462 is fed to the gaming system 418, which processes the input data 462 to update the game state of the video game.

During transport (ref. 440) of the audio packets 434, video packets 436, and haptic feedback packets 438, the transmission of data over the network can be monitored to ensure the cloud game stream quality of service. For example, network conditions can be monitored as indicated by reference 464, including both upstream and downstream network bandwidth, and the game streaming can be adjusted in response to changes in available bandwidth. That is, the encoding and decoding of network packets can be controlled based on present network conditions, as indicated by reference 466.

Figure 5:
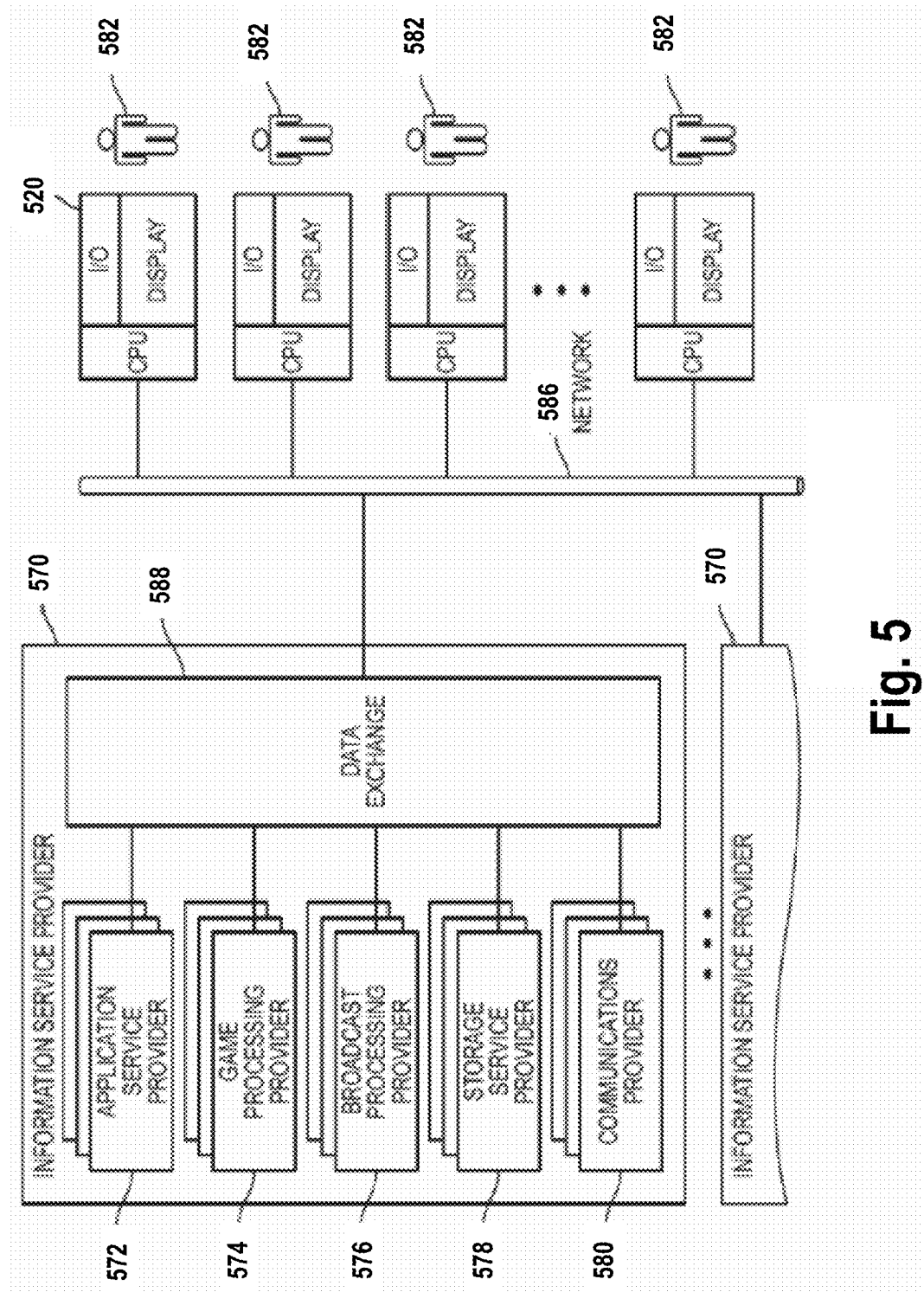
FIG. 5 illustrates an embodiment of an Information Service Provider architecture, in accordance with implementations of the disclosure.

FIG. 5 illustrates an embodiment of an Information Service Provider architecture. Information Service Providers (ISP) 570 delivers a multitude of information services to users 582 geographically dispersed and connected via network 586. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 570 includes Application Service Provider (ASP) 572, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 570 includes a Game Processing Server (GPS) 574 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 576 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 578 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 580 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 588 interconnects the several modules inside ISP 570 and connects these modules to users 582 via network 586. Data Exchange 588 can cover a small area where all the modules of ISP 570 are in close proximity, or can cover a large geographic area when the different modules are geographically dispersed. For example, Data Exchange 588 can include a fast Gigabit Ethernet (or faster) within a cabinet of a data center, or an intercontinental virtual area network (VLAN).

Users 582 access the remote services with client device 584, which includes at least a CPU, a memory, a display and I/O. The client device can be a PC, a mobile phone, a netbook, tablet, gaming system, a PDA, etc. In one embodiment, ISP 570 recognizes the type of device used by the client and adjusts the communication method employed. In other cases, client devices use a standard communications method, such as html, to access ISP 570.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:

executing a first session of a video game by a first server in a first data center;

concurrent with the first session, executing a second session of the video game by a second server in a second data center;

wherein the first session and second session independently generate a first game state and a second game state, respectively, the first game state and the second game state simultaneously representing a shared virtual space, such that the first game state and the second game state simultaneously represent a same region of the shared virtual space;

wherein events in the shared virtual space effected via the first session are implemented by the first server through transactions on a first set of memory objects stored at the first data center, the first session accessing a first library configured to generate a first set of update packages, based on the transactions on the first set of memory objects, and transmit the first set of update packages from the first server to the second server;

wherein events in the shared virtual space effected via the second session are implemented by the second server through transactions on a second set of memory objects stored at the second data center, the second session accessing a second library configured to generate a second set of update packages, based on the transactions on the second set of memory objects, and transmit the second set of update packages from the second server to the first server;

upon receiving the first set of update packages from the first server by the second server, applying the first set of update packages to the second set of memory objects by the second server at the second data center;

upon receiving the second set of update packages from the second server by the first server, applying the second set of update packages to the first set of memory objects by the first server at the first data center;

wherein the generating, transmitting, and applying of the first set and second set of update packages enables shared real-time interactivity in the shared virtual space via the first and second sessions.

2. The method of claim 1, wherein the first session and the second session do not communicate with each other, such that the first session executes by using inputs received at the first data center and the first set of memory objects to continuously update the first game state, and the second session executes by using inputs received at the second data center and the second set of memory objects to continuously update the second game state.

3. The method of claim 2, wherein the inputs received at the first data center are received from a first client device, and wherein the inputs received at the second data center are received from a second client device.

4. The method of claim 1, wherein the generating, transmitting, and applying of the first set and second set of update packages enables synchronization of at least some of the first set of memory objects with corresponding ones of the second set of memory objects.

5. The method of claim 4, wherein applying the first set of update packages changes one or more values of the corresponding ones of the second set of memory objects, and wherein applying the second set of update packages changes one or more values of the at least some of the first set of memory objects.

6. The method of claim 1, wherein each of the update packages includes a time stamp, a memory identifier, and a value for a memory object identified by the memory identifier.

7. The method of claim 6, wherein applying each of the update packages includes setting a value of the memory object identified by the memory identifier to the value of the update package.

8. The method of claim 6, wherein applying each of the update packages includes determining whether the time stamp of the update package is a latest time stamp for the memory object identified by the memory identifier, and if so, then setting a value of the memory object identified by the memory identifier to the value of the update package.

9. The method of claim 1, wherein the events in the shared virtual space effected via the first session include changes in position of a first virtual character that is controlled through the first session, and wherein the events in the shared virtual space effected via the second session include changes in position of a second virtual character that is controlled through the second session.

10. The method of claim 1, wherein the execution of the first session renders a first view of the shared virtual space, and wherein the execution of the second session renders a second view of the shared virtual space, such that the events in the shared virtual space effected through the first and second sessions are simultaneously viewable through the first and second views of the shared virtual space.

11. The method of claim 1, wherein the simultaneous representing of the same region of the shared virtual space enables concurrent interactivity in the same region of the shared virtual space by users respectively associated with the first and second sessions.

12. An online gaming service having two or more servers, the two or more servers being respectively located in two or more data centers, comprising:
a transaction layer implemented across the two or more servers, for handling synchronization between different sessions of a video game that are respectively executed by the two or more servers;
wherein the different sessions of the video game are respectively configured to provide viewing of same regions of a virtual space through respective client devices;
wherein the transaction layer is configured to identify sessions providing viewing of proximate regions of the virtual space, and effect transactional memory synchronization for the identified sessions, such that events in the virtual space generated by the identified sessions are synchronized across each of the identified sessions;
wherein effecting transactional memory synchronization for the identified sessions includes identifying a memory transaction that causes an event in the virtual space generated by one of the identified sessions, and propagating the memory transaction to other ones of the identified sessions;
wherein propagating the memory transaction includes receiving, through the transaction layer by the respective servers that execute the other ones of the identified sessions, an update package from the server that executes the one of the identified sessions.

13. The online gaming service of claim 12, wherein each session of the video game executes independently of the other sessions of the video game, such that each session of the video game does not manage communications with the other sessions of the video game, and such that each session of the video game is unaware of the other sessions of the video game.

14. The online gaming service of claim 12, wherein propagating the memory transaction to the other ones of the identified sessions includes generating the update package including a timestamp of the memory transaction, an identifier for a memory object to which the memory transaction is applied, and a value that is set by the memory transaction.

15. The online gaming service of claim 12, wherein the transaction layer is configured to identify sessions providing viewing of proximate regions of the virtual space, by analyzing virtual locations in the virtual space that are respectively associated to the different sessions of the video game.

16. An online gaming service having two or more servers, the two or more servers being respectively located in two or more data centers, comprising:
a transaction layer implemented across the two or more servers, for handling synchronization between different sessions of a video game that are respectively executed by the two or more servers;
wherein the different sessions of the video game are respectively configured to provide viewing of same regions of a virtual space through respective client devices;
wherein the transaction layer is configured to effect transactional memory synchronization for the different sessions, such that events in the virtual space generated by the different sessions are synchronized across each of the different sessions;
wherein each session of the video game executes independently of the other sessions of the video game, such that each session of the video game does not manage communications with the other sessions of the video game, and such that each session of the video game is unaware of the other sessions of the video game;
wherein effecting transactional memory synchronization for the identified sessions includes identifying a memory transaction that causes an event in the virtual space generated by one of the identified sessions, and propagating the memory transaction to other ones of the identified sessions;

wherein propagating the memory transaction includes receiving, through the transaction layer by the respective servers that execute the other ones of the identified sessions, an update package from the server that executes the one of the identified sessions.

17. The online gaming service of claim 16, wherein propagating the memory transaction to the other ones of the sessions includes generating the update package including a timestamp of the memory transaction, an identifier for a memory object to which the memory transaction is applied, and a value that is set by the memory transaction.

\* \* \* \* \*